No. 875,109. PATENTED DEC. 31, 1907.
A. J. REID.
COUPLING FOR CONTROLLING RODS OF BRAKES BETWEEN RAILWAY
AND OTHER VEHICLES.
APPLICATION FILED DEC. 3, 1906.

Witnesses
Percy Newell
M. J. Kendrick

Inventor
Aubrey J. Reid
per Fred Walsh
Attorney

UNITED STATES PATENT OFFICE.

AUBREY JAMES REID, OF NORTH SYDNEY, NEW SOUTH WALES, AUSTRALIA.

COUPLING FOR CONTROLLING-RODS OF BRAKES BETWEEN RAILWAY AND OTHER VEHICLES.

No. 875,109.　　　　Specification of Letters Patent.　　　Patented Dec. 31, 1907.

Application filed December 3, 1906. Serial No. 346,016.

*To all whom it may concern:*

Be it known that I, AUBREY JAMES REID, a subject of the King of Great Britain, residing at Mount street, North Sydney, in the State of New South Wales and Commonwealth of Australia, bank clerk, have invented new and useful Improvements in Coupling for Controlling - Rods of Brakes Between Railway and other Vehicles, of which the following is a specification.

This invention relates to certain improvements in couplings for controlling rods of brakes between coupled railway and other vehicles and it has been specially devised to produce such a coupling or coupling mechanism that the operating and transmitted power for the series of brakes will be adjusted or compensated as the vehicles oscillate or travel around curves or part and close on their buffers. But in order that this invention may be clearly understood reference will now be made to the drawings accompanying and forming part of this complete specification showing brake appurtenances according to these present improvements as applied to railway or tramway vehicles.

Figure 1:
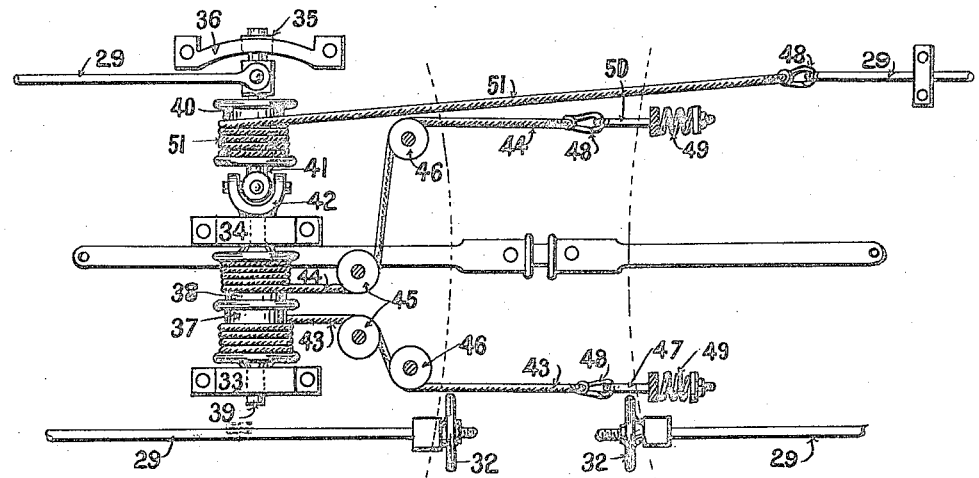
Figure 2:
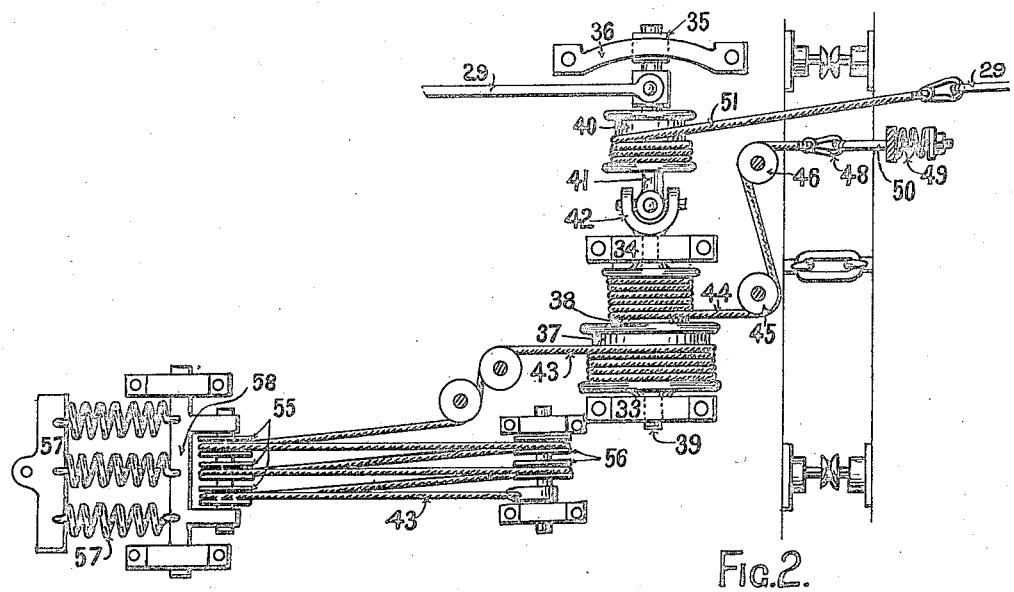

Figure 1 is a plan of the compensating coupling for the controlling rods of coupled vehicles. Fig. 2 is a plan of a modified construction of such compensating coupling for controlling rods.

When it is desired to operate the brake on two or more vehicles of a tram synchronously the compensating coupling shown in Fig. 1 is applied. The controlling or pull rods 29 are carried the whole length of the coupled cars and on the ends which terminate at the individual car there are hand wheels 32 screwed to fit a thread cut on said rods 29 and under ordinary conditions these wheels 32 with their respective rods 29 are free to work in the fixed blocks but when it is desired to uncouple the cars the brakes can be secured either on or off by the adjustment of said rods by the wheels 32.

Fixed in a suitable position under the car body are bearings 33, 34 and 35 the last being held in a horizontal curved slot 36. Two drums 37 and 38 are keyed to the same shaft 39 in bearings 33 and 34 and another drum 40 is on a shaft 41 connected by the universal joint 42 to shaft 39. The two drums 37 and 38 are wound with anchored flexible wire ropes 43 and 44 in opposite directions which after passing round the drums pass the fixed guiding pulleys 45 and 46. The rope 43 on drum 37 is carried to the headstock 47 of the next vehicle and is secured say by snap hook 48 to stem of the spring 49 while the rope 44 on drum 38 likewise is fast to a headstock 50 at a point equidistant from the center of the vehicle. On drum 40 the rope 51 after being anchored to and coiled round said drum is carried to the controlling or pull rod 29 on the next vehicle and snaphooked thereto. The other end of said last mentioned pull rod 29 terminates in a hand wheel 32 and has geared to it the operating mechanism (not shown.) The other pull rod 29 of the vehicle likewise has a hand-wheel 32 and at its further end is jointed to the shaft 41 carrying the drum 40 of the connecting rope 51.

If the vehicles are running on a straight road the tension on the ropes 43 and 44 keeps drums 37 and 38 in equilibrium but any oscillation of the cars will cause one or other of the drums 37 or 38 to either wind up or unwind respectively according to the direction of the oscillation and the revolution of the shaft 39 imparted to shaft 41 by the universal joint 42 will cause drum 40 to unwind or wind up in proportion as the distance between the controlling or pulling rods 29 varies and thereby maintain the rods 29 at a constant distance from each other. When the tension is put on the pull rods 29 in either direction drum 40 with its shaft 39 is free to work with its bearing 35 in the quadrant guide 36 and the rope 51 will actuate the connected pull rod 29 of the next vehicle.

The construction of this compensating coupling may be modified as shown in Fig. 2 and it is best so modified when applied to railway trains as it further compensates or overcomes the varying distances between vehicles due to the opening and closing of buffers. Parts of this compensating coupling are identical with those described with reference to Fig. 1 and bear the same distinguishing members. But in this case the connecting rope 43 for winding or unwinding the first drum 37 is dispensed with and the winding is performed by the rope 43 which passes over the loose purchase pulleys shown at 55 and 56 and the springs 57 in the sliding bridle 58 take up any slack in the ropes 45 and 51 owing to the closing or unclosing of the buffers and the drum 40 on re volving shaft 41 maintains the requisite tension between the controlling or pull rods 29.

Having now fully described and ascertained my said invention and the manner in which it is to be performed I declare that what I claim is:—

1. Improvements in brakes for railway and other vehicles, having in combination with two coupled vehicles, a longitudinally movable brake-applying member on each vehicle, flexible couplings connecting the members of the two vehicles, and a compensating device including the drum connected to the members for maintaining the operative length of the members constant under all conditions.

2. A brake for railway and other vehicles having in combination two coupled vehicles and a longitudinally movable brake-applying member on each, connections between the members, such connections including a drum, a flexible connection with the drum, and a brake-applying member of the coupled vehicle, and means for rotating the drum as the distance between the vehicles and their alinement varies.

3. A brake for railway and other vehicles having in combination a longitudinally movable brake-applying member upon each vehicle, a drum connected to and operated by a member on one vehicle and a flexible connection between the said drum and the member of the coupled vehicle, a second drum connected to and adapted to rotate the first drum, and a flexible connection between the second drum and the coupled vehicle for rotating the said drum as the distance between the vehicles and their alinement varies.

4. A brake for railway and other vehicles having in combination a longitudinally movable brake-applying member on each vehicle, a plurality of drums carried by one vehicle and carried to the brake-applying member thereon, a flexible connection between one of said drums and the brake-applying member on the coupled vehicle, and flexible connections between the other drums and the coupled vehicle, the said connections being connected to the coupled vehicle on opposite sides of the coupling.

5. A brake for railway and other vehicles having in combination a shaft upon one of the vehicle, and carrying a drum, a second shaft connected to the first shaft by a universal joint, and carrying a drum, a flexible connection with the second drum and a brake-applying mechanism for the coupled vehicle, a flexible connection between the coupled vehicle and the first of the drums, means for keeping the second flexible connection under tension, and means for bending the second shaft at the universal joint.

6. A brake for railway and other vehicles characterized by controlling pull-rods connected at one end to a revolving drum on one vehicle and connected by flexible connection at the other end to a similar revolving drum on the coupled vehicle, the shafts of the said drums being adapted to move longitudinally relatively to the vehicle and revolubly as moved by either of two other drums controlled by connecting flexible means to the coupled vehicle.

In testimony whereof I have signed my name to this specification in the presence of two subscribing witnesses.

AUBREY JAMES REID.

Witnesses:
PERCY NEWELL,
M. J. CANDRICK.